United States Patent [19]

Erwied et al.

[11] Patent Number: 4,656,210
[45] Date of Patent: Apr. 7, 1987

[54] STABILIZED POLYVINYL CHLORIDE MOLDING COMPOSITIONS

[75] Inventors: Werner Erwied, Langenfeld; Horst Upadek, Erkrath; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 732,102

[22] PCT Filed: Aug. 30, 1984

[86] PCT No.: PCT/EP84/00261

§ 371 Date: May 3, 1985

§ 102(e) Date: May 3, 1985

[87] PCT Pub. No.: WO85/01054

PCT Pub. Date: Mar. 14, 1985

[30] Foreign Application Priority Data

Sep. 5, 1983 [DE] Fed. Rep. of Germany ....... 3331967

[51] Int. Cl.$^4$ ............................................. C08K 5/41
[52] U.S. Cl. .................................. 524/167; 524/155; 524/171
[58] Field of Search ............... 524/167, 225, 302, 155, 524/170, 173, 171

[56] References Cited

U.S. PATENT DOCUMENTS

| | | | |
|---|---|---|---|
| 2,614,095 | 10/1952 | Shelley | 524/225 |
| 2,981,717 | 4/1961 | Boultbee | 524/303 |
| 3,297,629 | 1/1969 | Kauder | 524/225 |
| 3,453,225 | 7/1969 | Pollock | 524/151 |
| 4,217,258 | 8/1980 | Minagawa et al. | 524/302 |
| 4,338,226 | 7/1982 | Worscheck et al. | 524/302 |

OTHER PUBLICATIONS

Stapfer, C. H. et al: American Chemical Society, Div. Polymer Chem., Polymer Preprints, (Mar. 1971), vol. 12, No. 1, pp. 795–802.
Shelton, J. Reid: *Stabilization and Degradation of Polymers*, 215–225 (1978).
Stabilization Reactions Involving Oxidized Sulphur Compounds; W. L. Hawkins and Mrs. H. Sautter.
W. L. Hawkins, H. Sautter, Synergistic Antioxidant Combinations. Mechanism of Stabilization with Organo-Sulfur Compounds, 1963, Journal of Polymer Science: Part A, vol. 1, pp. 3499–3509.

*Primary Examiner*—Veronica P. Hoke
*Attorney, Agent, or Firm*—Ernest G. Szoke; Henry E. Millson, Jr.; Mark A. Greenfield

[57] ABSTRACT

Stabilized polyvinyl chloride molding compositions contain, per 100 parts by weight polymer, 0.02 to 5 parts by weight of at least one compound of Formula I and-/or Formula II

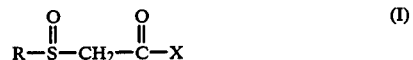

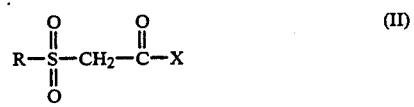

in which R represents an alkyl group with 1 to 18 carbon atoms, a cycloalkyl group with 5 or 6 carbon atoms, a phenyl group, an alkylphenyl group with 7 to 11 carbon atoms or an X—CO—CH$_2$ group, while X represents an NH$_2$ group or an OM group in which M represents lithium, sodium or potassium.

25 Claims, No Drawings

STABILIZED POLYVINYL CHLORIDE MOLDING COMPOSITIONS

BACKGROUND OF THE INVENTION

1. Field of the Invention

The invention pertains to stabilized thermoplastic molding compositions on the basis of polyvinyl chloride or essentially vinyl chloride-containing polymers.

2. Statement of the Related Art

In the molding processing of thermoplastic polymers to form pipes, bottles, shapes, films and the like, for example by extrusion, injection molding, blowing, deep drawing and calandering, degradation of the plastic can easily take place at the high temperatures thus occurring. This leads to undesirable discolorations and impairment of the mechanical properties. For this reason stabilizers are added to the polymers prior to thermal deformation to oppose such degradation. For polyvinyl chloride and essentially vinyl chloride-containing mixed polymers, the principal thermal stabilizers used are inorganic and organic lead salts, organic antimony compounds, organotin compounds, and cadmium/barium carboxylates and phenolates. The metal compounds mentioned are usually designated as primary stabilizers; secondary stabilizers or costabilizers are often added to improve their efficacy. Further details on the thermal stabilizers customarily employed for vinyl chloride polymers can be taken from the relevant literature, for example the *Encyclopedia of Polymer Science and Technology*, Vol. 12, New York, London, Sydney, Toronto, 1970, pp. 737 to 768.

The stabilizers mentioned show a fully satisfactory effect in practice. However, certain objections exist to the use of lead, antimony and cadmium compounds, especially toxicologic objections.

A number of organotin compounds are toxicologically unobjectionable, but their broad use is impeded by their high price. For this reason attempts have long been made to replace these compounds by less objectionable and more advantageously priced substances. For this reason it has become customary to use as primary stabilizers fatty acid salts, aromatic carboxylates and phenolates of the metals calcium, barium, zinc and aluminum, perhaps supplemented by costabilizers such as organic phosphites, imino compounds, epoxy compounds, polyhydric alcohols or 1,3-diketones. However, these new stabilizer systems involve to a greater or lesser degree the defect that they give an inadequate initial stability and/or inadequate long-term stability to the molding compositions to be stabilized. Therefore a need exists for substances with the aid of which the initial and/or long-term effect of such stabilizer systems can be decisively improved.

DESCRIPTION OF THE INVENTION

It has been found that certain β-oxosulfoxides and β-oxosulfones can be successfully used to stabilize polyvinyl chloride molding compositions. In particular it has been found that these compounds are able to increase the stabilizing effect of primary stabilizers on the basis of soaps, aromatic carboxylates and phenolates of the metals calcium, barium, zinc and aluminum as well as organotin compounds to a degree that could not be anticipated.

Thus the subject of the invention comprise stabilized polyvinyl chloride molding compositions, which contain at least one compound of Formula I and/or Formula II

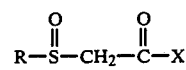

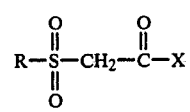

in which R represents an alkyl group with 1 to 18 carbon atoms, a cycloalkyl group with 5 or 6 carbon atoms, a phenyl group, an alkylphenyl group with 7 to 11 carbon atoms or an X—CO—CH₂ group, while X represents an NH₂ group or an OM group, in which M represents lithium, sodium or potassium.

The invention in particular includes stabilized molding compositions which, in addition to customary lubricants an other customary processing aids, contain a stabilizer combination of (1) primary stabilizers, selected from the group consisting of metal soap, aromatic metal carboxylates, metal phenolates and organotin compounds, and (2) at least one compound of Formula I and/or Formula II as costabilizers.

Also included in the invention are stabilizer combinations for polyvinyl chloride molding compositions containing primary stabilizers selected from the group consisting of metal soaps, aromatic metal carboxylates, metal phenolates and organotin compounds and containing at least one compound of Formula I and/or Formula II as costabilizers and possibly the customary lubricants and other processing aids.

The compounds of Formulas I and II involve known substances which can be obtained according to current methods of organic synthesis.

The sulfinyl compounds defined by Formula I may be obtained, for example, by alkylating sodium sulfide or sodium mercaptides with α-halocarbonyl compounds to the corresponding thioethers, followed by oxidation with hydrogen peroxide. General procedures are given, for example, by A. Schoberl and A. Wagner in Houben-Weyl, *Methods of Organic Chemistry (Methoden der Organischen Chemie)*, Vol. 9, p. 97 f., p. 105 f. and p. 211, 1955.

The sulfinyl compounds described by Formula II are generally accessible via oxidation of the corresponding thioethers, for example with potassium permanganate (A. Schoberl and A. Wagner in Houben-Weyl, *Methods of Organic Chemistry*, Vol. 9, p. 229 f., 1955).

Metal soaps are defined in connection with the invention as fatty acid salts of calcium, barium, zinc and aluminum. These metal soaps are preferably derived from fatty acids with 8 to 22 carbon atoms. Here the fatty acid component can specifically consist of caprylic, capric, lauric, myristic, palmitic, stearic and behenic acids. In addition branched chain fatty acids such as 2-ethylhexanoic acid, 2-hexyldecanoic acid, and 2-octyldodecanoic acid as well as hydroxy fatty acids, for example, 9,(10)-hydroxystearic acid, 9,10-dihydroxystearic acid and 9(10)-hydroxy-10(9)-methoxystearic acid come under consideration. The compositions in accordance with the invention may contain salts of individual fatty acids as well as salts of fatty acid mixtures, as are obtained from natural fats and oils.

Aromatic metal carboxylates coming under consideration particularly include the calcium, barium, zinc and aluminum salts of benzoic acid and substituted benzoic acids, especially alkyl-substituted benzoic acids.

Metal phenolates coming under consideration are the phenolates, alkyl phenolates and naphthenates of calcium, barium, zinc and aluminum. So-called superbasic phenolates or naphthenates are also usable additives.

Organotin compounds coming under consideration principally include the dialkyl compounds of tetravalent tin, for example dimethyltin-S,S-bis-(isooctylthioglycolate), dibutyltin dilaurate, dibutyltin maleate, dibutyltin-bis-(monobutylmaleate), dibutyltin bis-(monobutylmaleate), dibutyltin bis-(laurylmercaptide), dibutyltin-β-mercaptopropionate, dibutyltin-S,S-bis-(isooctylthioglycolate)di-n-octyltin maleate, di-n-octyltin-bis-(monoethylmaleate), di-n-octyltin-β-mercaptopropionate and di-n-octyltin-S,S-bis-(isooctylthioglycolate), and also monoalkyltin compounds, e.g., monomethyltin tris-(isooctylthioglycolate) and mono-n-octyltin tris-(isooctylthioglycolate), wherein the monoalkyl compounds of tetravalent tin are preferably used in mixtures with dialkyltin compounds.

The stabilized polyvinyl chloride molding compositions generally contain 0.02 to 5 parts by weight of compounds of Formula I and II per 100 parts by weight of polymer. The metal soaps, aromatic metal carboxylates and metal phenolates can be present in quantities of 0.05 to 5 parts by weight per 100 parts by weight of polymer.

In a specific embodiment of the invention the polyvinyl chloride molding compositions contains, per 100 parts by weight of polymer, 0.1 to 3 parts by weight calcium soap and/or 0.1 to 3 parts by weight barium soap and/or 0.1 to 3 parts by weight zinc soap, wherein the soaps are preferably derived from fatty acids with 8 to 22 carbon atoms and the total fraction of the metal soaps normally does not exceed 3 parts by weight per 100 parts by weight of polymer.

In many cases it may be advantageous to add to the polyvinyl chloride molding compositions, per 100 parts by weight of polymer, 0.2 to 5 parts by weight of a synthetic, crystalline, finely divided sodium aluminosilicate containing 13 to 25 wt-% bound water with a composition—based on the anhydrous form—of 0.7 to 1.1 $Na_2O.Al_2O_3.1.3-2.4SiO_2$.

The above-defined sodium aluminosilicates involve zeolites of the type NaA, which have an average effective pore diameter of 4 Å, for which reason they are known as zeolites 4 A. The use of these zeolites as auxiliaries in the processing of thermoplastics is known, see for example U.S. Pat. No. 4,000,100 and European Patent Application No. 0027,588.

In addition to the additives mentioned the polyvinyl chloride molding compositions in accordance with the invention may contain partial esters of polyols with 2 to 6 carbon atoms and 2 to 6 hydroxyl groups and/or of fatty acids with 8 to 22 carbon atoms as lubricants with stabilizing effect. For each molecule on the average these partial esters have at least one free polyol hydroxyl group and can be prepared by esterification of the corresponding polyols with fatty acids of the indicated chain lengths, possibly in the presence of customary esterification catalysts. Polyols and fatty acids are reacted with one another in a molar ratio of 1:1 to 1:(n−1), wherein n represents the number of hydroxyl groups in the polyol. The components are preferably used in quantities such that partial esters with an OH number of between 140 and 580, especially between 170 and 540 are formed. The reaction product, which in each case represents an ester mixture, should have an acid number of less than 15, preferably less than 8. Suitable polyol components are ethylene glycol, propylene glycol-1,2, propylene glycol-1,3, butylene glycol-1,2, butylene glycol-1,4 hexanediol-1,6, neopentyl glycol, trimethylolethane, erythritol, mannitol and sorbitol and in particular glycerine, trimethylolpropane, ditrimethylolpropane, pentaerythritol and dipentaerythritol. Several fatty acid components include for example caprylic, capric, lauric, myristic, palmitic, stearic and behenic acids. Synthetic fatty acids with the numbers of carbon atoms mentioned or unsaturated fatty acids, such as oleic acid and linolenic acid, or substituted fatty acids, especially hydroxylated acids such as 12-hydroxystearic acid, may also be used. For practical reasons mixtures of fatty acids are generally employed, as are obtained from natural fats and oils.

The polyvinyl chloride molding compositions generally contain the polyol partial esters in quantities of 0.2 to 2.0 parts by weight per 100 parts by weight of polymer.

It may also be advantageous if the polyvinyl chloride molding compositions in accordance with the invention contain thioglycolic acid esters of alcohols with 1 to 6 hydroxyl groups and 3 to 36 cargon atoms. Here, thioglycolic acid esters of relatively low volatility come under consideration, for example thioglycolic acid esters from glycerine, trimethylolpropane, isomeric octanols, decanol, Guerbet alcohols from octanols, or technical dimerized fatty alcohols. These esters can also contain free hydroxyl groups; it is likewise possible to use mixtures of thioglycolic acid esters and free polyvalent alcohols.

The polyvinyl chloride molding compositions in accordance with the invention can contain the thioglycolic acid esters mentioned in quantities of 0.1 to 10 parts by weight per 100 parts by weight of polymer.

In addition if desired an advantageous effect can be achieved if 1,3-dicarbonyl compounds are present in the polyvinyl chloride molding compositions in accordance with the invention. In general, those 1,3-diketones come under consideration which contain at least two alkyl, aryl, or aralkyl groups in the molecule, for example dodecyl, hexadecyl, octadecyl, phenyl or benzyl groups. Typical representatives of this class of substances include palmitoylstearoylmethane or stearoylbenzoylmethane.

The polyvinyl chloride molding compositions in accordance with the invention can contain such 1,3-dicarbonyl compounds in quantities of 0.1 to 5 parts by weight per 100 parts by weight polymer.

The polyvinyl chloride molding compositions in accordance with the invention may contain additional auxiliaries and processing aids, for example waxy hydrocarbons such as paraffins with a solidification point in the range of 40° to 110° C. and/or lower molecular weight polyethylene types, the softening point of which should be below 140° C. Advantageously these waxy substances are combined with free fatty acids, wherein fatty acids with 12 to 22 carbon atoms, as are available from natural fats and oils, are preferred. Particularly favorable results are obtained with palmitic and stearic acids. Conventional fatty alcohols with 12 to 22 carbon atoms can also be present in the thermoplastic molding compositions in accordance with the invention.

Additional additives coming under consideration are certain polymers, for example those based on methyl methacrylate, methyl methacrylate/butyl acrylate, ethyl acrylate, methyl methacrylate/acrylic acid and butyl methacrylate/styrene. Such polymers and copolymers are designated as flow promoters. Polymer from butyl acrylate also act as parting agents in the shaping process of polyvinyl chloride molding compositions.

In certain cases it may be advantageous if the polyvinyl chloride molding compositions in accordance with the invention contain antioxidants. Compounds coming under consideration here include, for example, diphenylolpropane, 2,5-bis-(1,1-dimethylpropyl)-hydroquinone; 2,6-di-tert-butyl-4-methylphenol; octadecyl-(3,5-di-tert-butyl-4-hydroxyphenyl)-propionate; 1,1,3-tris-(5-tert-butyl-4-hydroxy-2-methylphenyl)-butane; or dilauryl thiodipropionate.

Polyvinyl chloride molding compositions intended for the manufacture of hollow articles and films may contain 0.5 to 5 parts by weight epoxidized soy oil and 0.1 and 0.8 parts by weight higher molecular weight ester wax per 100 parts by weight of polymer. High molecular weight ester waxes coming under consideration include montan wax, paraffin oxidates and complex esters.

The basis of the stabilized thermoplastic molding compositions in accordance with the invention consists of homopolymers or mixed polymers of vinyl chloride. The mixed polymers contain at least 50 mol-%, preferably at least 80 mol-% vinyl chloride. The polymers can be produced in any desired way, for example by suspension, emulsion or block copolymerization. Their K value can be between about 35 and 80. Also falling within the framework of the invention are molding compositions on the basis of postchlorinated polyvinyl chloride as well as on the basis of resin mixtures predominantly containing homopolymers or copolymers of vinyl chloride. The concept of polyvinyl chloride molding compositions in accordance with the invention covers both the semifinished products destined for molding and articles molded from them in any desired way.

The individual components of the polyvinyl chloride molding compositions in accordance with the invention can be combined by mixing the components in conventional mixers. In this process it is possible first to mix the various components of the stabilizer combination with one another, then to combine this mixture with the basic polyvinyl chloride material.

The stabilizer combinations for polyvinyl chloride molding compositions in accordance with the invention in the simplest case consist of a primary stabilizer selected from the group consisting of metal soaps, aromatic metal carboxylates, metal phenolates and organotin compounds and at least one compound of Formulas I and/or II.

A specific embodiment of the invention provides for stabilizer combinations in which, per part by weight of the compounds of Formula I and/or Formula II, 0.5 to 10 parts by weight calcium soaps and/or 0.5 to 10 parts by weight barium soaps and/or 0.5 to 10 parts by weight zinc soaps are present, wherein the soaps are derived from fatty acids with 8 to 22 carbon atoms. The total share of the metal soaps mentioned should not exceed 20 parts by weight per part by weight compounds of Formulas I and II.

Further basic components of the stabilizer combination coming under consideration in accordance with the invention include the above-described sodium aluminosilicates, which can be present in quantities of 0.2 to 20, preferably 10, 10 parts by weight per part by weight compounds of Formulas I and II. The stabilizer combinations preferably contain at least one lubricant from the group of the above-defined partial esters of fatty acids and polyols. The partial esters can be present in quantities of 0.2 to 5 parts by weight per part by weight compounds of Formulas I and II.

The stabilizer combinations in accordance with the invention can if desired be supplemented by additional auxiliaries and processing aids for polyvinyl chloride molding compositions.

The stabilizer combinations can be obtained by simple mechanical mixing of the components with the aid of conventional mixers. During manufacture they are generally obtained as pourable, dust-free products.

EXAMPLES

Preparation of Compounds of Formula I

1. Methylsulfinyl Acetamide

Into a mixture of 13 g (0.15 mole) methyl mercaptoacetonitrile and 21 g (0.45 mole) formic acid, hydrogen chloride gas was introduced at room temperature at the rate of about 20 to 25 l/hr for 6 hr. Then the reaction mixture was evaporated to dryness at 70° C. in a rotary evaporator. The residue was recrystallized from ethanol. In this process 9.5 g methyl mercaptoacetamide were obtained in the form of white crystals with a melting point of 102°–103.5° C.

Under cooling and agitation, 11.3 g of 30 wt-% hydrogen peroxide solution (0.1 mole $H_2O_2$) were added to a solution of 9.5 g (0.09 mole) methyl mercaptoacetamide in 200 ml acetone. Then the mixture was held at 28° C. for 4 hr under cooling. Subsequently acetone and water were distilled off from the reaction mixture in the rotary evaporator. The residue remaining was recrystallized twice from acetonitrile. A total of 2.3 g methylsulfinyl acetamide were obtained as white crystals with a melting point of 80°–82° C.

2. Sodium Salt of Decylsulfinylacetic Acid

Into a solution of 54 g (1 mole) sodium methylate in 450 ml methanol, 174 g (1 mole) decylmercaptan were slowly dropped at room temperature. Within 1 hr 108.5 g (1 mole) methyl chloroacetate were dropped into the mixture produced. Then the mixture was heated under reflux for 4 hr. The cooled reaction solution was treated with an ice/water mixture. The mixture was extracted with ether, and the ether solution washed until neutral. After distilling off the ether the product was distilled under an oil pump vacuum. 110 g decylmercaptoacetic acid methyl ester passed over at 102°–120° C./0.01 mbar.

The total amount of the decylmercaptoacetic acid methyl ester obtained was heated under reflux with excess sodium hydroxide (10 mol-%) in methanol/water for 30 min. The decylmercaptoacetic acid was precipitated from the cooled solution with hydrochloric acid and separated by filtration.

The 84.5 g (0.36 mole) decylmercaptoacetic acid ester obtained were dissolved in 400 ml acetone and mixed, under agitation and cooling, with 45 g of 30 wt-% hydrogen peroxide solution (0.4 mole $H_2O_2$). The mixture was agitated under cooling for 4 hr at 28° C. Then acetone and water were evaporated from the reaction mixture in the rotary evaporator.

The 81.5 g (0.33 mole) decylsulfinylacetic acid remaining as the residue were agitated with a solution of 13.1 g (0.33 mole) sodium hydroxide in 200 ml water for 30 min at 70° C. By concentrating in the rotary evaporator, 88 g sodium decylsulfinyl acetate were obtained.

3. Sodium Salt of Phenylsulfinylacetic Acid

To a solution of 210 g (1.25 mole) phenylmercaptoacetic acid in 500 ml glacial acetic acid, 150 g of a 30 wt-% hydrogen peroxide solution (1.33 mole $H_2O_2$) were slowly dropped in, wherein the temperature of the reaction mixture was maintained at 40° to 60° C. by cooling. After the highly exothermal reaction died down the mixture was allowed to stand overnight at room temperature. Water and acetic acid were distilled off in a rotary evaporator at a bath temperature of 35° to 40° C. The residue remaining comprised 205 g phenylsulfinylacetic acid.

To prepare the sodium salt, 184 g (1 mole) phenylsulfinylacetic acid was agitated for 30 min at 70° C. with 40 g (1 mole) sodium hydroxide in 400 ml water. 204 g sodium phenylsulfinyl acetate were obtained by concentration in the rotary evaporator.

4. Disodium Salt of Sulfinyldiacetic acid

To a solution of 180 g (1.2 mole) thiodiglycolic acid in 600 ml acetone were slowly dropped in under agitation and cooling 162.2 g of a 30 wt-% hydrogen peroxide solution (1.44 mole $H_2O_2$). After addition was complete the mixture was stirred for an additional 4 hr at 28° C. Then acetone and water were distilled off in the rotary evaporator. The remaining crystal slurry was washed four times with about 400 ml ether each, then dried. In this process 165.5 g sulfinyldiacetic acid with a melting point of 118°+119° C. were obtained. To produce the sodium salt, 165.5g (0.83 mole) sulfinyldiacetic acid were agitated for 30 min at 70° C. with 66.2 g (1.66 mole) sodium hydroxide in 400 ml water. 199.5 g sodium sulfinyl acetate were obtained by concentration in the rotary evaporator.

5. Sulfinyldiacetamide

To a solution of 64 g (0.5 mole) sodium sulfide hydrate in 500 ml water were gradually added under agitation 93.5 g (1 mole) 2-chloro-acetamide; the temperature of the reaction mixture increased to 60° C. Following the end of addition the mixture was further agitated for an additional 2 hr at room temperature before being evaporated to dryness in the rotary evaporator. The solid residue was extracted 6 times with 400 ml boiling ethanol each. The combined ethanol extracts were evaporated to dryness in the rotary evaporator, and the product obtained recrystallized from water. In this process 22.9 g thiodiglycolic acid diamide were obtained as white crystals with a melting point of 163.5°–167.5° C.

22.5 g (0.15 mole) thiodiglycolic acid diamide were dissolved in 250 ml acetone and mixed under agitation and cooling with 18.8 g 30 wt-% hydrogen peroxide solution.(0.17 mole $H_2O_2$). The mixture was agitated with cooling for 4 hr at 28° C. When the acetone and water were distilled off on the rotary evaporator, 23.2 g sulfinyldiacetamide remained behind as a solid, white residue.

6. Sodium Salt of Phenylsulfonylacetic Acid

To a solution of 100 g (0.6 mole) phenylmercaptoacetic acid, 33.6 g (0.6 mole) potassium hydroxide and 100 g magnesium sulfate in 1200 ml of water, a solution of 128 g (0.81 mole) potassium permanganate in 3080 ml of water was slowly dropped in at room temperature under agitation; the internal temperature rose to 36° C. Following the end of addition, agitation was continued for 2 hr. The reaction mixture was allowed to stand overnight. Then sulfur dioxide was introduced until decolorization of the permanganate took place. The manganese dioxide that precipitated was filtered off. The filtrate was acidified with hydrochloric acid and extracted with ether. The combined ether extracts were dried with sodium sulfate. Following evaporation of the ether, 68.9 g phenylsulfonylacetic acid remained behind as colorless crystals with a melting point of 112°–113° C.

65 g (0.33 mole) phenylsulfonylacetic acid in a solution of 13.2 g (0.33 mole) sodium hydroxide and 200 ml water were heated at 70° C. for 30 min under agitation. 71.5 g sodium phenylsulfonyl acetate were obtained by evaporating in the rotary evaporator.

EXAMPLES A THROUGH I

The thermoplastic molding composition A (Comparison Composition) was obtained by mechanically mixing 100 parts by weight suspension PVC (K value 70; Vestolit A 7054; manufacturer: Chemische Werke Huls AG, Marl, F.R. Germany)
0.2 parts by weight stearic acid
0.2 parts by weight paraffin, m.p. 72° C.
0.5 parts by weight pentaerythritol ester of stearic acid (molar ratio 1:1.5; OH no. 212)
with the stabilizer combination A' consisting of
1.0 parts by weight calcium stearate
0.5 parts by weight zinc stearate.

To produce the polyvinyl chloride molding compositions B through I in accordance with the invention the stabilizer mixture A' was transformed to the stabilizer combinations B' through I' with the aid of the following additives:

In B': 0.5 parts by weight methylsulfinylacetamide (Preparation Example 1)

In C': 0.5 parts by weight sodium salt of decylsulfinylacetic acid (Preparation Example 2)

In D': 0.5 parts by weight sodium salt of phenylsulfinylacetic acid (Preparation Example 3)

In E': 0.5 parts by weight disodium salt of sulfinyldiacetic acid (Preparation Example 4)

In F': 0.5 parts by weight disodium salt of sulfinyldiacetic acid 0.25 parts by weight benzoylstearoylmethane In G': 0.5 parts by weight sulfinyldiacetamide (Preparation Example 5)

In H': 0.5 parts by weight methyl sulfonylacetamide (Commercial) 0.5 parts by weight sodium aluminosilicate In I': 0.5 parts by weight sodium salt of phenylsulfonylacetic acid (Preparation Example 6).

In the stabilizer combination H' a finely divided synthetic zeolite NaA ($Na_2O:Al_2O_3:SiO_2=0.9:1:2.4$; water content 19 wt-%) was used as the sodium aluminosilicate.

The compositions of the stabilized polyvinyl chloride molding compositions A through I obtained in this manner can be taken from the following table.

The effects of the stabilizer combinations A' through I' in the corresponding polyvinyl chloride molding compositions A through I were investigated on the basis of the "static thermal stability" of rolled sheets. For this purpose the molding compositions were processed on a laboratory rolling unit with dimensions of 350×150 mm (Schwabenthan Company) at a roller temperature of 170° C. and a roller speed of 300 rpm in uniform operation; the test sheets were produced in a 5-min period. The sheets, about 0.5 mm thick, were cut into square test pieces, 10 mm on a side, which were then exposed to a temperature of 180° C. in a drying oven with 6 rotating racks (Heraeus FT 420 R). At 10 min intervals samples were taken and their color change evaluated.

In the table which follows in each case the time period is given after which the test was ended because of excessive discoloration (stability termination).

TABLE

| Constituent (parts by weight) | Polyvinyl chloride molding composition | | | | | | | | |
|---|---|---|---|---|---|---|---|---|---|
| | A | B | C | D | E | F | G | H | I |
| Suspension PVC | 100 | 100 | 100 | 100 | 100 | 100 | 100 | 100 | 100 |
| Calcium stearate | 1,0 | 1,0 | 1,0 | 1,0 | 1,0 | 1,0 | 1,0 | 1,0 | 1,0 |
| Zinc stearate | 0,5 | 0,5 | 0,5 | 0,5 | 0,5 | 0,5 | 0,5 | 0,5 | 0,5 |
| Stearic acid | 0,2 | 0,2 | 0,2 | 0,2 | 0,2 | 0,2 | 0,2 | 0,2 | 0,2 |
| Paraffin | 0,2 | 0,2 | 0,2 | 0,2 | 0,2 | 0,2 | 0,2 | 0,2 | 0,2 |
| Pentaerythritolstearic acid ester | 0,5 | 0,5 | 0,5 | 0,5 | 0,5 | 0,5 | 0,5 | 0,5 | 0,5 |
| Methylsulfinyl acetamide | — | 0,5 | — | — | — | — | — | — | — |
| Na—decylsulfinyl acetate | — | — | 0,5 | — | — | — | — | — | — |
| Na—phenylsulfinyl acetate | — | — | — | 0,5 | — | — | — | — | — |
| Di-Na—sulfonyl diacetate | — | — | — | — | 0,5 | 0,5 | — | — | — |
| Sulfinyl diacetamide | — | — | — | — | — | — | 0,5 | — | — |
| Methylsulfonyl acetamide | — | — | — | — | — | — | — | 0,5 | — |
| Na—Phenylsulfonyl acetate | — | — | — | — | — | — | — | — | 0,5 |
| Benzoylstearoyl methane | — | — | — | — | — | 0,25 | — | — | — |
| Na—Aluminosilicate | — | — | — | — | — | — | — | 0,5 | — |
| Stability termination (min) | 40 | 60 | 60 | 80 | 70 | 70 | 60 | 70 | 60 |

What is claimed is:

1. A stabilized polymeric molding composition consisting essentially of:
   a polymer which is polyvinyl chloride;
   a primary stabilizer which is at least one metal soap, aromatic metal carboxylate, metal phenolate, or organotin compound, present in at least a minimal stabilizer-effective amount; and
   a costabilizer present in at least an amount effective to increase the stabilizing effect of said primary stabilizer, consisting essentially of at least one sulfonyl compound of the formula:

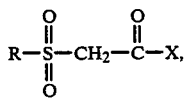

in which R is a $C_{1-18}$-alkyl, a $C_{5-6}$-cycloalkyl, a phenyl, a $C_{7-11}$-alkylphenyl, or X—CO—CH$_2$ wherein X is NH$_2$ or OM and M is lithium, sodium, or potassium.

2. The composition of claim 1 wherein said costabilizer is at least one of: disodium sulfonyl diacetate; methylsulfonyl acetamide, or sodium phenylsulfonyl acetate.

3. The composition of claim 2 wherein said costabilizer is at least one of: disodium sulfonyl diacetate; methylsulfonyl acetamide, or sodium phenylsulfonyl acetate.

4. The composition of claim 1 wherein
   said metal soap is at least one Ca, Ba, Zn, or Al salt of a $C_{8-22}$-fatty acid or hydroxy fatty acid;
   said aromatic metal carboxylate is at least one Ca, Ba, Zn, or Al salt of benzoic or alkyl-substituted benzoic acid;
   said metal phenolate is at least one Ca, Ba, Zn or Al phenolate, alkyl phenolate, superbasic phenolate, naphthenate, or superbasic naphthenate; and
   said organotin compound is at least one dialkyltetravalent tin, monoalkyl-tetravalent tin, or a mixture thereof.

5. The composition of claim 1 wherein the ingredients are present in the proportions:
   polymer—100 parts by weight;
   primary stabilizer—0.05 to 5 parts by weight; and
   costabilizer—0.02 to 5 parts by weight.

6. The composition of claim 3 wherein the ingredients are present in the proportion:
   polymer—100 parts by weight;
   primary stabilizer—0.05 to 5 parts by weight; and
   costabilizer—0.02 to 5 parts by weight.

7. The composition of claim 1 wherein said primary stabilizer is at least one Ca, Ba, or Zn soap of a $C_{8-22}$ fatty acid, each said soap present in 0.1 to 3 parts by weight to a total maximum of 3 parts by weight, all quantities per 100 parts by weight of polymer.

8. The composition of claim 2 wherein said primary stabilizer is at least one Ca, Ba, or Zn soap of a $C_{8-22}$ fatty acid, each said soap present in 0.1 to 3 parts by weight to a total maximum of 3 parts by weight, all quantities per 100 parts by weight of polymer.

9. The composition of claim 1 with the addition of zeolite 4 A, present in 0.2 to 5 parts by weight per 100 parts by weight of polymer.

10. The composition of claim 4 with the addition of zeolite 4 A, present in 0.2 to 5 parts by weight per 100 parts by weight of polymer.

11. The composition of claim 2 with the addition of zeolite 4 A, present in 0.2 to 5 parts by weight per 100 parts by weight of polymer.

12. The composition of claim 6 with the addition of zeolite 4 A, present in 0.2 to 5 parts by weight per 100 parts by weight of polymer.

13. The composition of claim 7 with the addition of zeolite 4 A, present in 0.2 to 5 parts by weight of polymer.

14. The composition of claim 8 with the addition of zeolite 4 A, present in 0.2 to 5 parts by weight per 100 parts by weight of polymer.

15. The composition of claim 1 with the addition of at least one of:
    a lubricant with stabilizing effect consisting essentially of at least one partial ester of a $C_{8-22}$-fatty acid or of a $C_{2-6}$-polyol having 2 to 6 hydroxyl moieties, present in 0.2 to 2.0 parts by weight per 100 parts by weight of polymer;
    at least one thioglycolic acid ester of a $C_{3-36}$-alcohol having 1 to 6 hydroxyl moieties, present in 0.1 to 10 parts by weight per 100 parts by weight of polymer; and
    at least one 1,3-diketone containing at least two alkyl, aryl, or aralkyl moieties in the molecule, present in 0.1 to 5 parts by weight per 100 parts by weight of polymer.

16. The composition of claim 15 with the addition of at least one:

processing aid selected from: paraffins with a solidification point of 40° to 110° C.; lower molecular weight polyethylene; $C_{12-22}$-fatty acids; $C_{12-22}$-fatty alcohols; or any mixture thereof;

additional polymer selected from: methyl methacrylate; methyl methacrylate/butyl acrylate; ethyl acrylate; methyl methacrylate/acrylic acid, or butyl methacrylate/styrene; present in a flow promoter effective amount;

additional polymer selected from: butyl acrylate polymers; present in a parting agent effective amount; or antioxidant selected from: diphenylolpropane; 2,5-bis-(1,1-dimethyl propyl)-hydroquinone; 2,6-di-tert-butyl-4-methylphenol octadecyl-(3,5-di-tert-butyl-4-hydroxyphenol)-propionate; 1,1-3-tris-(5-tert-butyl-4-hydroxy-2-methylphenyl)-butane; or dilauryl thiopropionate; present in an antioxidant effective amount.

17. The composition of claim 1, specifically intended for the manufacture of hollow articles and films, with the addition of:

epoxidized soy oil present in 0.5 to 5 parts by weight per 100 parts by weight of polymer; and a high molecular weight ester wax selected from montan wax, paraffin oxidates, and complex esters, present in 0.1 to 0.8 parts by weight per 100 parts by weight of polymer.

18. The composition of claim 1 wherein said polyvinyl chloride consists essentially of homopolymers or mixed polymers containing at least 50 mol% vinyl chloride.

19. The composition of claim 1 wherein said polyvinyl chloride consists essentially of homopolymers or mixed polymers containing at least 80 mol% vinyl chloride.

20. The composition of claim 1 wherein said primary stabilizer is a Ca, Ba, or Zn soap of a $C_{8-22}$-fatty acid or a mixture thereof, each said soap being present in 0.5 to 10 times the weight of costabilizer present up to a total amount not exceeding 20 times the weight of costabilizer present.

21. The composition of claim 5 wherein said primary stabilizer is a Ca, Ba, or Zn soap of a $C_{8-22}$-fatty acid or a mixture thereof, each said soap being present in 0.5 to 10 times the weight of costabilizer present up to a total amount not exceeding 20 times the weight of costabilizer present.

22. The composition of claim 1 with the addition of zeolite 4 A, present in an amount 0.2 to 20 times the weight of costabilizer present.

23. The composition of claim 5 with the addition of zeolite 4 A, present in an amount 0.2 to 20 times the weight of costabilizer present.

24. The composition of claim 20 with the addition of zeolite 4 A, present in an amount 0.2 to 20 times the weight of costabilizer present.

25. The composition of claim 15 wherein said lubricant is present and in an amount 0.2 to 5 times the weight of costabilizer present.

* * * * *